United States Patent
Colliaux (10) Patent No.: US 11,283,755 B2
(45) Date of Patent: Mar. 22, 2022

(54) METHOD FOR IDENTIFYING A COMMUNICATION NODE

(71) Applicant: SAGEMCOM BROADBAND SAS, Rueil Malmaison (FR)

(72) Inventor: Mathieu Colliaux, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 104 days.

(21) Appl. No.: 16/709,279

(22) Filed: Dec. 10, 2019

(65) Prior Publication Data

US 2020/0204518 A1    Jun. 25, 2020

(30) Foreign Application Priority Data

Dec. 20, 2018 (FR) ...................................... 1873578

(51) Int. Cl.
| | |
|---|---|
| *H04L 29/12* | (2006.01) |
| *H04L 12/741* | (2013.01) |
| *H04L 12/753* | (2013.01) |
| *H04W 8/00* | (2009.01) |
| *H04L 61/103* | (2022.01) |
| *H04L 12/66* | (2006.01) |
| *H04L 45/745* | (2022.01) |

(Continued)

(52) U.S. Cl.
CPC ............ *H04L 61/103* (2013.01); *H04L 12/66* (2013.01); *H04L 45/745* (2013.01); *H04L 61/2015* (2013.01); *H04L 61/6022* (2013.01)

(58) Field of Classification Search
None
See application file for complete search history.

(56) References Cited

U.S. PATENT DOCUMENTS 7,127,524 B1 * 10/2006 Renda .................... H04L 29/12
709/245
8,427,969 B1   4/2013 Juillard
(Continued)

OTHER PUBLICATIONS

Sep. 30, 2019 Search Report issued in French Patent Application No. 1873578.

(Continued)

*Primary Examiner* — Hong S Cho
(74) *Attorney, Agent, or Firm* — Oliff PLC; R. Brian Drozd (57) ABSTRACT

A system for extending wireless communication coverage includes a subnetwork comprising a set of interconnected nodes implementing a functionality of access point of one and the same wireless communication network. The system monitors messages exchanged during an address-resolution phase, and obtains therefrom an association between network address and MAC address of each device connected to the LAN and node of the subnetwork, and interface information representing an interface via which the message that made it possible to obtain said association was received. In order to identify a node closest to the target device, the system parses the address resolution tables while seeking the above-identified association corresponding to the target device and obtaining therefrom the associated interface information; and identifies the node closest to the target device as the node the address resolution table of which does not reference any node in the subnetwork in association with said interface information.

14 Claims, 3 Drawing Sheets

(51) Int. Cl.
*H04L 61/5014* (2022.01)
*H04L 101/622* (2022.01)

(56) References Cited

U.S. PATENT DOCUMENTS

2006/0209852 A1    9/2006  Wakumoto et al.
2019/0342258 A1*  11/2019  Raj ..................... H04L 45/745

OTHER PUBLICATIONS

Wang et al; "A Low-cost, High-efficiency SDN Framework to Diminish Redundant ARP and IGMP Traffics in Large-scale LANs;" IEEE International Conference on Computer Software & Applications; pp. 894-903; 2018.

* cited by examiner

METHOD FOR IDENTIFYING A COMMUNICATION NODE

TECHNICAL FIELD

The present invention relates to a method for identifying a communication node, in a system for extending wireless communication coverage, to which a particular device is connected.

PRIOR ART

In local area networks LAN, systems for extending wireless communication coverage can be used in order to increase the range of these local area networks LAN by coordinating a plurality of distributed access points AP. These various access points AP are integrated in communication nodes, hereinafter simply referred to as nodes, interconnected by way of a backhaul subnetwork and all making available the same wireless local area network WLAN (wireless local area network). In the context of Wi-Fi (registered trade mark) technology, all these access points AP thus use the same SSID identifier (service set identifier) and the same password (also referred to as security key). Thus, the extension of wireless communication coverage is transparent for the devices connected to the wireless local area network WLAN.

The system for extending wireless communication coverage is thus typically connected to the internet through an internet-access gateway GW, for example by way of an Ethernet lead providing the connection, to the gateway GW, of a principal node in the system for extending wireless communication coverage. The system for extending wireless communication coverage then serves as a relay between the gateway and each device connected by wire, or wirelessly, to the local area network LAN, and also serves as a relay between these various devices connected to the local area network LAN to enable them to communicate with each other.

The nodes in the backhaul subnetwork are connected to each other by a structure in the form of a tree, a node then being able to serve as a relay between two other nodes in the backhaul subnetwork. The nodes are thus interconnected by way of wired connections, for example of the Ethernet type, or wireless connections, for example a Wi-Fi (registered trade mark) connection using an SSID identifier different from said local area network WLAN itself. The nodes in the backhaul subnetwork thus communicate with each other by way of logic links, for example IP communications or encrypted tunnels or communications in accordance with a proprietary communication protocol. These logic links are typically established by way of probe and discovery messages.

The nodes in the backhaul subnetwork are typically coordinated in a centralised manner, by a master node among said nodes in the backhaul subnetwork. The master node can be designated by fixed configuration or dynamically by election. All the nodes in the backhaul subnetwork thus have knowledge of the master node, and are capable of identifying it by way of its MAC (medium access control) address.

In the case of the local area networks LAN at the subscribers of an internet access provider, the master node is preferentially the node in the backhaul subnetwork that is closest to the internet-access gateway GW. This makes it possible to specifically activate functionalities thereon, such as for example parental control functionalities, since the master node then has a strategic position for concentration of data streams while being the node in the system for extending wireless communication coverage closest to the internet-access gateway GW. It is then desirable to locate, in the topology of the backhaul subnetwork, which is this node that is closest to said gateway GW.

Other situations in which it is advantageous to locate, in the topology of the backhaul subnetwork, which node is the closest to a device in particular. For example, it is advantageous to determine which node is closest to a television set or to a multimedia source, in order to activate thereon a centralised module for controlling said television set or respectively said multimedia source, intended to retranscribe, in a language understandable to the television set or respectively to the multimedia source, commands received in various formats coming from varied control devices connected to the local area network LAN. It is also advantageous to know, in the topology of the backhaul subnetwork, which node is closest to a device in particular, in order to provide assistance with diagnosis in the event of malfunctioning of this device.

It is then desirable to overcome these drawbacks of the prior art.

DISCLOSURE OF THE INVENTION

One object of the present invention is to propose a method for identifying a node closest to a target device in a system for extending wireless communication coverage comprising a backhaul subnetwork in the form of a tree comprising a set of interconnected nodes, a plurality of nodes in the backhaul subnetwork implementing a functionality of access point of one and the same wireless communication network, the system for extending wireless communication coverage being suitable for making it possible to connect devices to said nodes by way of the wireless communication network or by wires in order to form a local area network. The method comprises the following steps: monitoring messages exchanged during an address resolution phase, and obtaining therefrom an association between network address and MAC address of each device connected to the local area network and node in the backhaul subnetwork; filling in, in each said node, an address resolution table by indicating therein each association between network address and MAC address obtained by said node, as well as interface information representing an interface of said node via which the message that made it possible to obtain said association was received. And, in order to identify the node closest to the target device among said nodes in the backhaul subnetwork, the method comprises an analysis of the resolution tables including the following steps: parsing the address resolution tables while seeking the association between network address and MAC address corresponding to said target address, and while obtaining the associated interface information; and identifying the node closest to the target device as being the node the address resolution table of which does not reference any node in the backhaul subnetwork in association with said interface information. Thus the node closest to the target device among said nodes in the backhaul subnetwork is easily identified.

According to a particular embodiment, each node in the backhaul subnetwork parses its own resolution table and transmits a message indicating whether said node in question is closest to the target device among the nodes in the backhaul subnetwork.

According to a particular embodiment, each node in the backhaul subnetwork parses its own resolution table and transmits a message including an analysis score representing the topological distance, in the backhaul subnetwork, that separates it from the target device.

According to a particular embodiment, each node in the backhaul subnetwork carries out the analysis for one or more predetermined target devices, at each change made to its address resolution table.

According to a particular embodiment, in analysing the ARP tables, the entries in the address resolution tables that correspond to interfaces on which it is predetermined that the target device is not connected are excluded.

According to a particular embodiment, the target device is an internet-access gateway which has been identified by way of a dedicated field of a lease provided to a node in the backhaul subnetwork by a DHCP server.

There is also proposed a method for functionality activation in a system for extending wireless communication coverage comprising a backhaul subnetwork in the form of a tree comprising a set of interconnected nodes, the functionality activation method including an identification of a node closest to a target device among said nodes in the backhaul subnetwork as previously mentioned and furthermore an activation of said functionality specifically in the node identified as being closest to the target device.

According to a particular embodiment, the target device is an internet-access gateway and the functionality is a functionality of a master node coordinating the backhaul subnetwork.

According to a particular embodiment, the method for activating the functionality further comprises an activation of supplementary functionalities in the node identified as being closest to the internet-access gateway, the supplementary functionalities being firewall functionalities vis-à-vis data streams exchanged via the internet through the internet-access gateway and/or parental control functionalities vis-à-vis data streams exchanged via the internet through the internet-access gateway.

There is also proposed a system for extending wireless communication coverage comprising a backhaul subnetwork in the form of a tree comprising a set of interconnected nodes, a plurality of nodes in the backhaul subnetwork implementing a functionality of access point of one and the same wireless communication network, the system for extending wireless communication coverage being suitable for making it possible to connect devices to said nodes by way of the wireless communication network or by wires in order to form a local area network. The system comprises: means for monitoring messages exchanged during an address resolution phase, and obtaining therefrom an association between network address and MAC address of each device connected to the local area network and node in the backhaul subnetwork; means for filling in, in each said node, an address resolution table by indicating therein each association between network address and MAC address obtained by said node, as well as interface information representing an interface of said node via which the message that made it possible to obtain said association was received. And, in order to identify a node closest to the target device among said nodes in the backhaul subnetwork, the system comprises means for analysing the resolution tables including: means for parsing the address resolution tables while seeking the association between network address and MAC address corresponding to said target device, and obtaining the associated interface information; and means for identifying the node closest to the target device as being the node the address resolution table of which does not reference any node in the backhaul subnetwork in association with said interface information.

According to a particular embodiment, the system further comprises means for activating a functionality specifically in the node identified as being closest to the target device.

According to a particular embodiment, the target device is an internet-access gateway and the functionality is a functionality of a master node coordinating the backhaul subnetwork.

According to a particular embodiment, the system further comprises means for activating supplementary functionalities specifically in the node identified as being closest to the internet-access gateway, the supplementary functionalities being firewall functionalities vis-à-vis data streams exchanged via the internet through the internet-access gateway and/or parental control functionalities vis-à-vis data flows exchanged via the internet through the internet-access gateway.

A node is also proposed, referred to as node in question, intended to be used in a system for extending wireless communication coverage comprising a backhaul subnetwork in the form of a tree comprising a set of interconnected nodes including the node in question, a plurality of nodes in the backhaul subnetwork implementing a functionality of access point of one and the same wireless communication network, the system for extending wireless communication coverage being suitable for making it possible to connect devices to said nodes by way of the wireless communication network or by wires in order to form a local area network. The node in question comprises: means for monitoring messages exchanged during an address resolution phase, and obtaining therefrom an association between network address and MAC address of each device connected to the local area network and node in the backhaul subnetwork; means for filling in an address resolution table by indicating therein each association between network address and MAC address obtained by the node in question, as well as interface information representing an interface of the node in question via which the message that made it possible to obtain said association was received. And, in order to identify whether the node in question is closest to the target device among said nodes in the backhaul subnetwork, the node in question comprises means for analysing its resolution table including: means for parsing the address resolution table by seeking the association between network address and MAC address corresponding to said target device, and obtaining therefrom the associated interface information; means for identifying the node in question as being closest to the target device when the address resolution table does not reference any node in the backhaul subnetwork in association with said interface information, and for identifying the node in question as not being closest to the target device otherwise; and means for informing, via the backhaul subnetwork, that the node in question is or is not the node closest to the target device among said nodes in the backhaul subnetwork.

BRIEF DESCRIPTION OF THE DRAWINGS

The features of the invention mentioned above, as well as others, will emerge more clearly from a reading of the following description of at least one example embodiment, said description being given in relation to the accompanying drawings, among which.

DETAILED DISCLOSURE OF EMBODIMENTS

Figure 1:
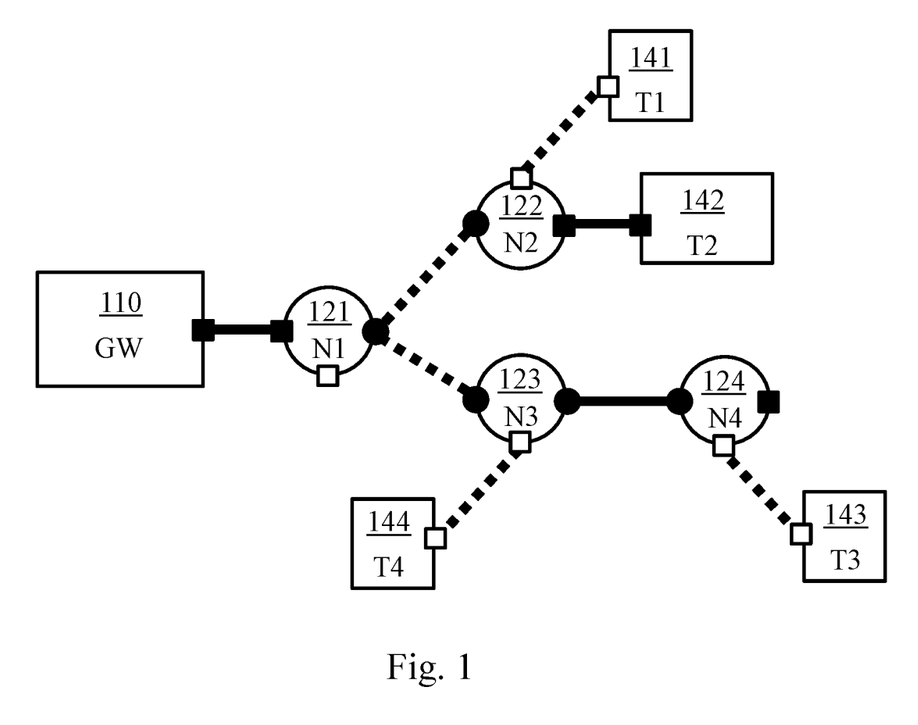
FIG. 1 illustrates schematically a communication system in which the present invention may be implemented.

FIG. 1 illustrates schematically a communication system in which the present invention may be implemented; the communication system comprises a system for extending wireless communication coverage constructed around a backhaul subnetwork comprising a set of interconnected nodes N1 121, N2 122, N3 123, N4 124. Each node in a plurality of nodes in the backhaul subnetwork, typically all the nodes in the backhaul subnetwork, implements a functionality of access point AP of a wireless local area network WLAN (wireless local area network). The nodes in said plurality of nodes all make available one and the same local wireless network WLAN (same name, etc.). In the context of Wi-Fi (registered trade mark) technology, all these access points AP thus use the same SSID identifier and the same password. The coverage area of the wireless local area network WLAN, and therefore in general terms of the local area network LAN thus formed around the system for extending wireless communication coverage, is then extended transparently for each terminal, or station, that connects thereto.

The nodes N1 121, N2 122, N3 123, N4 124 of the backhaul subnetwork are connected to each other by way of a structure in the form of a tree, a node then being able to serve as a relay between two other nodes in the backhaul subnetwork. The nodes N1 121, N2 122, N3 123, N4 124 are thus interconnected by way of wired connections, for example of the Ethernet type, or wireless connections, for example a Wi-Fi (registered trade mark) connection using an SSID identifier different from said wireless local area network WLAN itself. The nodes N1 121, N2 122, N3 123, N4 124 of the backhaul subnetwork thus communicate with each other by way of logic links, for example IP communications or encrypted tunnels or communications in accordance with a proprietary communication protocol. However, when a wired interface is used for the backhaul subnetwork, this wired interface cannot be used for another purpose, in particular not for connecting a terminal thereto.

By way of illustration, FIG. 1 shows that the node N1 121 is connected to the node N2 122 and to the node N3 123 by way of a wireless connection (distinct from the wireless local area network WLAN itself), and the node N4 124 is connected to the node N3 123 by way of a wired connection.

The system for extending wireless communication coverage thus makes it possible to interconnect an internet-access gateway GW 110, a terminal T1 141, a terminal T2 142, a terminal T3 143 and a terminal T4 144. The terminal T1 141 is for example a smartphone connected by a wireless connection to the node N2 122, that is to say the terminal T1 141 is thus connected via the wireless local area network WLAN by way of the node N2 122 acting as an access point AP. The terminal T2 142 is for example a television set connected by a wired connection to the node N2 122. The terminal T3 143 is for example a tablet connected by a wireless connection to the node N4 124, that is to say the terminal T3 143 is thus connected via the wireless local area network WLAN by way of the node N4 124 acting as an access point AP. The terminal T4 144 is for example a network storage unit NAS (network attached storage) connected by a wireless connection to the node N3 123, that is to say the terminal T4 144 is thus connected via the wireless local area network WLAN by way of the node N3 123 acting as an access point AP.

The nodes in the backhaul subnetwork are coordinated in a centralised fashion, by a master node among said nodes in the backhaul subnetwork. The master node can be designated by fixed configuration or dynamically by election. The master node is for example the node in the backhaul subnetwork that is closest to the internet-access gateway GW 110, namely the node N1 121 in the context of FIG. 1. A particular implementation for election of the master node so as to be closest to the internet-access gateway GW 110 is detailed below in relation to FIG. 8.

All the nodes in the backhaul subnetwork thus have knowledge of the master node and are capable of identifying it by way of its MAC address and/or its network address (e.g. IP address). All the nodes in the backhaul subnetwork also have knowledge of all the other nodes in the backhaul subnetwork and are capable of identifying them by way of their MAC addresses and/or their network addresses (e.g. IP addresses).

Figure 2:
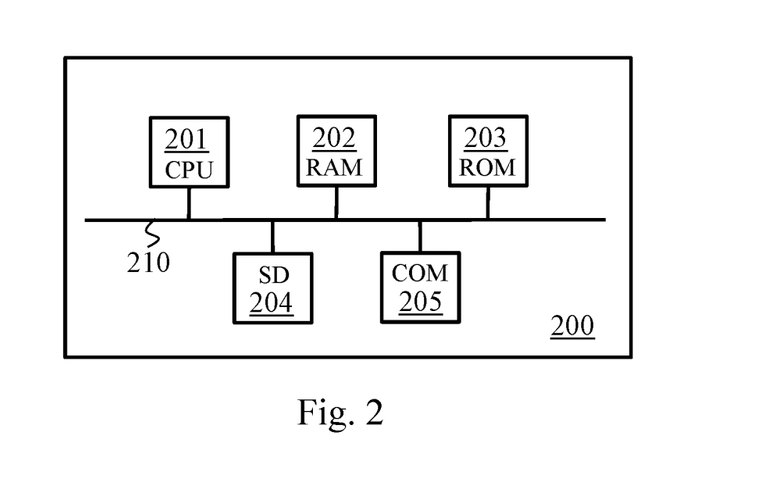
FIG. 2 illustrates schematically a example of hardware arrangement of nodes in a backhaul subnetwork of the communication system.

FIG. 2 illustrates schematically an example of hardware architecture of any node 200 in the backhaul subnetwork.

The example of hardware architecture presented comprises, connected by a communication bus 210: a processor CPU (central processing unit) 201; a random access memory RAM 202; a read only memory ROM 203 or a flash memory; a storage unit or a storage medium reader, such as an SD (Secure Digital) card reader 204 or a hard disk drive HDD; and at least one set of communication interfaces COM 205. The set of communication interfaces COM 205 makes it possible to implement the functionality of access point AP in order to extend the coverage of the wireless local area network WLAN and to make it possible to establish the backhaul subnetwork.

The processor CPU 205 is capable of executing instructions loaded into the RAM memory 202 from the ROM memory 203, from an external memory (such as an SD card), from a storage medium (such as the hard disk drive HDD), or from a communication network. On powering up, the processor CPU 201 is capable of reading instructions from the RAM memory 202 and executing them. These instructions form a computer program causing the implementation, by the processor CPU 201, of all or some of the algorithms and steps described below.

Thus all or some of the algorithms and steps described below can be implemented in software form by the execution of a set of instructions by a programmable machine, such as a DSP (digital signal processor) or a microcontroller or a processor. All or some of the algorithms and steps described below can also be implemented in hardware form by a machine or a dedicated component, such as an FPGA (field-programmable gate array) or an ASIC (application-specific integrated circuit). Thus the nodes N1 121, N2 122, N3 123, N4 124 comprise electronic circuits suitable and configured for implementing the algorithms and steps described below.

Figure 3:
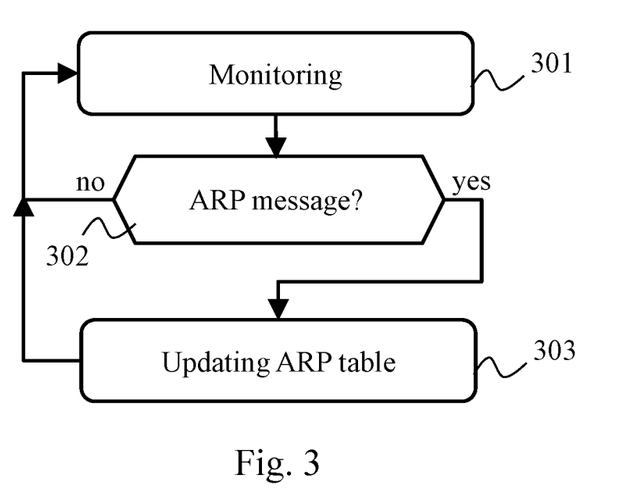
FIG. 3 illustrates schematically an algorithm for updating an address resolution table.

FIG. 3 illustrates schematically an algorithm for updating an address resolution table.

When a device connects to a communication network, an address resolution phase is established. This enables the various devices in the communication network to make the association between network address and MAC address. In the case of Ethernet networks, the ARP (Address Resolution Protocol, as described in the normative document RFC 826) is thus implemented automatically, e.g. by the kernel of the operating system, to enable the equipment to collect the information necessary for establishing communication and thus to make any IP address of the local area network LAN coincide with the corresponding MAC address.

In order to perform an address resolution with regard to a device B with which a device A wishes to communicate, the device A broadcasts an ARP request in the communication network, here the local area network LAN. The ARP request identifies the network and MAC addresses of the device A, as well as the network address of the device B. Breaking down the ARP request, in accordance with the normative document RFC 826, shows that this identification information is transmitted physically through fields ar$sha, which takes the value @MAC_A (where @MAC_A is the MAC address of the device A), ar$spa, which takes the value @IP_A (where @IP_A is the IP address of the device A), and ar$tpa, which takes the value @IP_B (where @IP_B is the IP address of the device B). As for the field ar$tha, this takes the value 0 since, at this moment, the MAC address (@MAC_B) of the device B is unknown to the device A.

The devices in the local area network LAN the IP addresses of which do not correspond to @IP_B will simply ignore this ARP request. However, each node in the backhaul subnetwork will profit from this in order to populate an ARP table that is particular to it, by entering therein the pair @IP_A/@MAC_A corresponding to the device A originating the ARP request. In addition, each node in the backhaul subnetwork enters therein, in association with the pair @IP_A/@MAC_A, information INT representing the interface of said node via which the ARP request was received by said node. Entering therein the information INT enables said node to know which interface to use for joining the device A. Taking the example of FIG. 1, when the terminal T1 141 broadcasts such an ARP request, the node N2 122 stores, in its ARP table, in association with the MAC and IP addresses of the terminal T1 141 indicated in the ARP request in question, information representing the wireless interface with the wireless local area network WLAN. Likewise, when the terminal T2 142 broadcasts such an ARP request, the node N2 122 stores, in its ARP table, in association with the MAC and IP addresses of the terminal T2 142 indicated in the ARP request in question, information representing the wired interface to which the terminal T2 142 is connected. And, from the point of view of the node N4 124, the ARP table includes, in association with the MAC and IP addresses of the terminal T1 141, information representing the wired interface used with the node N3 123 (via which the ARP request emanating from the terminal T1 141 was relayed to the node N2 122). Likewise, the ARP table of the node N4 124 includes, in association with the MAC and IP addresses of the terminal T2 142, information representing the wired interface used with the node N3 123 (via which the ARP request emanating from the terminal T2 142 was relayed to the node N2 122).

The device B, the IP address of which corresponds to @IP_B as indicated in the broadcast ARP request, responds to the ARP request broadcast by the device A by retransmitting an ARP response solely intended for the device A, thus enabling the device A to populate its ARP table with the pair @IP_B/@MAC_B thus discovered. Each node in the backhaul subnetwork that sees the ARP response passing can also populate its own ARP table with the pair @IP_B/@MAC_B, as well as in association with information representing the interface of said node via which the ARP response was received by said node. Entering therein the information representing this interface enables said node to know which interface to use to join the device B.

For convenience, the address resolution tables are hereinafter referred to as ARP tables.

Thus, in a step 301, each node in the backhaul subnetwork (i.e. each node in the system for extending wireless communication coverage) monitors the exchanges taking place in the address resolution phase. To do this, each node in the backhaul subnetwork continuously, on each of its physical interfaces taken individually, listens to the messages broadcast by all the devices in the network.

In a step 302, any node that has received a message determines whether the message received corresponds to a broadcast ARP request. If such is the case, a step 303 is performed; otherwise the step 301 is repeated.

In the step 303, each node that has received a broadcast ARP request completes its ARP table, as previously explained.

The algorithm in FIG. 3 can be completed so as to complete the ARP table by way of the ARP requests received (e.g. in transit), as previously explained.

For each node, the ARP table is thus completed over time and stabilises until a change in topology occurs (e.g. addition or removal of a node, or more generally a device, to or from the local area network LAN).

It should be noted that the entries in the ARP table corresponding to the other nodes in the backhaul subnetwork are easily identifiable. This is because, when the backhaul subnetwork is established, exchanges are made between the nodes in said backhaul subnetwork, and each node can thus construct a list containing at least the network addresses (e.g. IP addresses) of the nodes constituting the backhaul subnetwork. This list may also contain supplementary information, such as for example serial numbers of the notes in question or any other information necessary for ensuring nominal functioning of the system for extending wireless communication coverage.

Figure 4:
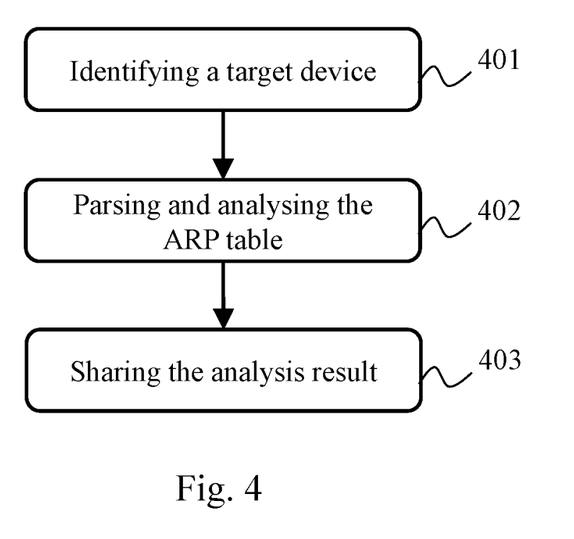
FIG. 4 illustrates schematically an algorithm for analysing an address resolution table.

FIG. 4 illustrates schematically an ARP table analysis algorithm. The algorithm in FIG. 4 is used by a node in the backhaul subnetwork vis-à-vis its own ARP table or vis-à-vis an ARP table of another node in the backhaul subnetwork that was communicated to it by this other node (for example because an analysis of the ARP tables is carried out in a centralised fashion). The objective is to identify the node in the backhaul subnetwork that is closest, from a point of view of topological location, to a target device in the local area network LAN. This objective can be achieved by way of the ARP tables. The algorithm in FIG. 4 describes the steps carried out for an ARP table.

In a step 401, the node in question obtains information identifying the target device in the local area network LAN. The target device is for example identified by way of its network address (e.g. IP address). This information can be supplied by another node in the backhaul subnetwork; for example, the master node may request each of the nodes in the backhaul subnetwork to analyse its own ARP table, as described below in relation to FIG. 5. This information may in a variant be known in advance. For example, the ARP table analysis is carried out by default using the internet-access gateway GW 110 as a target device, in particular in order to elect the master node, as described below in relation to FIG. 8.

In a step 402, the node in question parses and analyses the ARP table, so as to determine whether the target device is referenced therein. If the ARP table actually references the target device, the node in question recovers the information INT stored in association. Next the node in question counts in the ARP table how many nodes in the backhaul subnetwork (i.e. in the system for extending wireless communication coverage) are entered in the ARP table in association with this interface represented by the information INT. If no node in the backhaul subnetwork is referenced in association with this interface represented by the information INT, this means that the node the ARP table of which is thus parsed is closest to the target device. If at least one node in the backhaul subnetwork is referenced in association with this interface represented by the information INT, this means that the node the ARP table of which is thus parsed is not closest to the target device.

In a step 403, the node in question shares, as required, the result of the analysis carried out at the step 402. For example, when the node in question has analysed its own ARP table, the node in question transmits a message indicating whether said node in question is or is not closest to the target device among the nodes in the backhaul subnetwork. According to another example, still when the node in question has analysed its own ARP table, the node in question transmits a message supplying an analysis score representing the topological distance, in the backhaul subnetwork, that separates it from the target device.

By proceeding thus for each ARP table of the nodes in the backhaul subnetwork, it is possible to identify which node is closest to the target device connected to the LAN. This may be done in a centralised fashion, for example by the master node, by recovering the ARP tables from the various nodes in the backhaul subnetwork. This may be done in a distributed manner by the various nodes in the backhaul subnetwork, which then communicate the result of their respective analyses to the master node, as described below in relation to FIG. 5.

In a particular embodiment, each node in the backhaul subnetwork carries out this analysis for one or more predetermined target devices, at each change made to its ARP table. For example, when a change is made to its ARP table, the node in question carries out the analysis in order to determine whether it is closest to the internet-access gateway GW 110. If the node in question determines that it becomes the node closest to the internet-access gateway GW 110, then it can self-attribute the role of master node and inform the other nodes in the backhaul subnetwork of this. A negotiation may also take place with the node that was up until then the master node, in the case of analysis results at variance with each other (a situation that reveals an anomaly because the backhaul subnetwork is in tree form).

In a particular embodiment, in analysing the ARP tables the entries in the ARP tables that correspond to interfaces on which it is predetermined that the target device is not connected are excluded. For example, when the target device is the internet-access gateway GW 110 and it is predefined that the internet-access gateway GW 110 is necessarily connected by a wired connection to the system for extending wireless communication coverage, in analysing the ARP tables any entry associated with a wireless interface is excluded. This exclusion of entries in the ARP tables in the analysis may be predefined or notified by the master node when it requests the nodes in the backhaul subnetwork to analyse the ARP tables.

Figure 5:
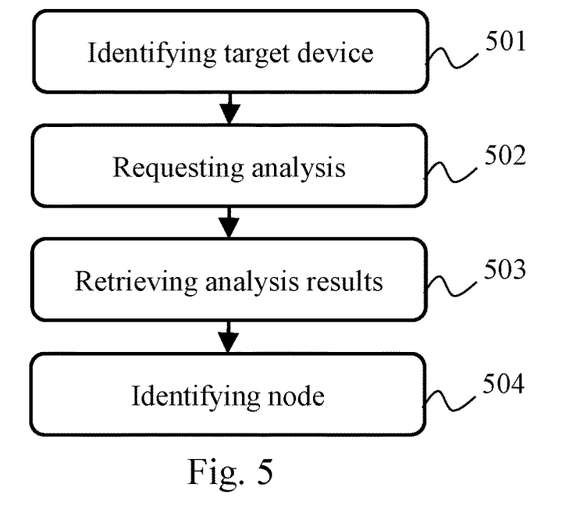
FIG. 5 illustrates schematically an algorithm for identifying a node closest to a device in particular.

FIG. 5 illustrates schematically an algorithm for identifying a node closest to a device in particular (target device). The algorithm in FIG. 5 is implemented by the master node.

In a step 501, the master node identifies a target device. For example, the target device is the internet-access gateway GW 110, or the terminal T2 142. The target device may be identified by configuration (e.g. entry of its IP address). The target device may be identified following an event in the local area network LAN (e.g. connection of a new device, which then becomes a target device within the meaning of the algorithm in FIG. 5). For example, the internet-access gateway GW 110 may be identified by way of a lease (attribution of an IP address) provided by a DHCP server (Dynamic Host Configuration Protocol, as defined by the normative document RFC 1531, amended and supplemented by the normative documents RFC 1534, RFC 2131 and RFC 2132), which is generally integrated in the internet-access gateway. When said DHCP server provides a lease (attribution of IP address) to a node in the backhaul subnetwork, whether or not the DHCP server is in the internet-access gateway, the lease in question supplies, in a dedicated field, the IP address of said internet-access gateway. Thus any node in the backhaul subnetwork has knowledge of the IP address of said internet-access gateway. According to another example, a device newly connected to the system for extending wireless communication coverage may export a description of the functionalities offered by this newly connected device (e.g. using the UPnP (Universal Plug n' Play) protocol, and the content of this description may push the master node to request analysis of the ARP tables in order to determine which node is closest to said newly connected device. Many other events may be triggers of the algorithm in FIG. 5 and identify the target device.

In a step 502, the master node requests an ARP table analysis vis-à-vis the target device, with each of the nodes in the backhaul subnetwork. Each of the nodes in the backhaul subnetwork (including the master node) then carries out the ARP table analysis, as described in relation to FIG. 4, vis-à-vis its own ARP table.

In a step 503, the master node recovers the results of the ARP table analyses carried out by the nodes in the backhaul subnetwork.

In a step 504, the master node, by way of said results, identifies the node in the backhaul subnetwork that is closest to the target device among all the nodes in the backhaul subnetwork.

It should be noted that the master node may request the ARP table analysis vis-à-vis the target device sequentially. The master node requests the nodes to carry out the ARP table analysis one after the other and stops the process as soon as a node indicates, in its ARP table analysis result, that said node is closest to the target device among all the nodes in the backhaul subnetwork.

Figure 6:
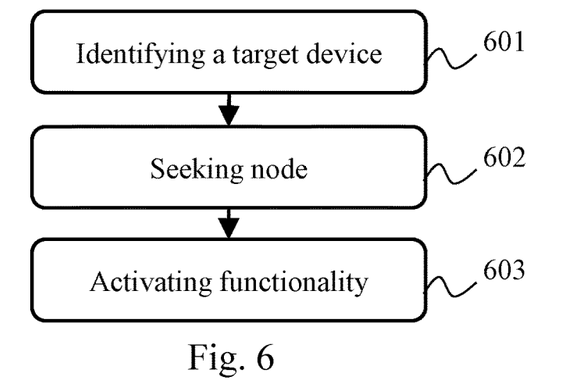
FIG. 6 illustrates schematically an algorithm for activating a functionality specifically in a node identified closest to a device in particular.

FIG. 6 illustrates schematically an algorithm for activating functionality specifically in a node identified closest to a device in particular (target device).

In a step 601, the master node identifies a target device, as already described in relation to FIG. 5.

In a step 602, the master node initiates a search for a node closest to the target device by analysing the ARP tables as previously described.

In a step 603, the master node, by virtue of the analysis of the ARP tables, knows which node in the backhaul subnetwork is closest to the target device. The master node then specifically instructs this node that is identified as being closest to the target device to activate a predetermined functionality. For example, this functionality is a functionality for supporting the target device in question, e.g. a module controlling said target device. Specifically activating the functionality closest to the target device makes it possible to limit the distance between the target device and the functionality in question, which is more effective in terms of consumption of network resources.

Figure 7:
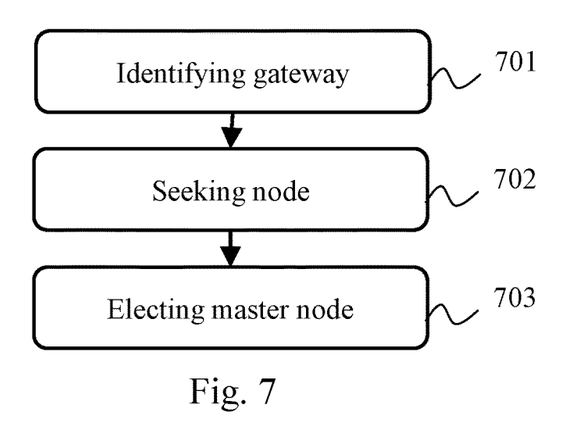
FIG. 7 illustrates schematically an algorithm for electing a master node in the backhaul subnetwork.

FIG. 7 illustrates schematically an algorithm for electing a master node in the backhaul subnetwork.

In a step 701, the master node identifies a target device, as already described in relation to FIG. 5. The target device is, in the context of the algorithm in FIG. 7, the internet-access gateway GW 110.

In a step 702, the master node initiates a search for a node closest to the target device by analysing the ARP tables as previously described.

In a step 703, the node closest to the target device is specifically elected as the master device. If there is a change of master node, the previous master node informs the other nodes in the backhaul subnetwork that a new master node has been elected and supplies information identifying the new master node. The algorithm in FIG. 7 is thus a particular embodiment of the algorithm in FIG. 6, where the functionality to be activated is the master-node functionality. Other supplementary functionalities may thus be specifically activated in the master node vis-à-vis the internet-access gateway GW 110. More particularly, such supplementary functionalities are firewall functionalities vis-à-vis data streams exchanged via the internet through the internet-access gateway GW 110 and/or parental control functionalities vis-à-vis data streams exchanged via the internet through the internet-access gateway GW 110. Activating the functionality closest to the internet-access gateway GW 110 makes it possible to limit the distance between the internet-access gateway GW 110 and the functionality in question, which is more effective in terms of consumption of network resources and in terms of security of the local area network LAN devices vis-à-vis these data streams exchanged via the internet through the internet-access gateway GW 110.

The invention claimed is:

1. A method for identifying a node closest to a target device in a system for extending wireless communication coverage comprising a backhaul subnetwork in the form of a tree comprising a set of interconnected nodes, a plurality of nodes in the backhaul subnetwork implementing a functionality of access point of one and the same wireless communication network, the system for extending wireless communication coverage being suitable for making it possible to connect devices comprising said target device to said nodes by way of the wireless communication network or by wires in order to form a local area network, wherein the method comprises:

monitoring messages exchanged during an address resolution phase, and obtaining therefrom an association between network address and Medium Access Control MAC address of each device connected to the local area network and node in the backhaul subnetwork;

filling in, in each said node, an address resolution table by indicating therein each association between network address and MAC address obtained by said node, as well as interface information representing an interface of said node via which the message that made it possible to obtain said association was received;

and, in order to identify the node closest to the target device among said nodes in the backhaul subnetwork, the method comprises an analysis of the resolution tables including the following steps:

parsing the address resolution tables while seeking the association between network address and MAC address corresponding to said target address, and while obtaining the associated interface information; and identifying the node closest to the target device as being the node the address resolution table of which does not reference any node in the backhaul subnetwork in association with said interface information.

2. The method according to claim 1, wherein each node in the backhaul subnetwork parses its own resolution table so as to determine whether the target device is referenced therein and according to the identification of the node closest to the target device, transmits a message indicating whether said node in question is closest to the target device among the nodes in the backhaul subnetwork.

3. The method according to claim 1, wherein each node in the backhaul subnetwork parses its own resolution table and transmits a message including an analysis score representing the topological distance, in the backhaul subnetwork, that separates it from the target device.

4. The method according to claim 1, wherein each node in the backhaul subnetwork carries out the analysis for one or more predetermined target devices, at each change made to its address resolution table.

5. The method according to claim 1, wherein, in analysing the address resolution, the entries in the address resolution tables that correspond to interfaces on which it is predetermined that the target device is not connected are excluded.

6. The method according to claim 1, wherein the target device is an internet-access gateway which has been identified by way of a dedicated field of a lease provided to a node in the backhaul subnetwork by a Dynamic Host Configuration Protocol DHCP server.

7. The method for functionality activation in a system for extending wireless communication coverage comprising a backhaul subnetwork in the form of a tree comprising a set of interconnected nodes, the method including an identification of a node closest to a target device among said nodes in the backhaul subnetwork according to claim 1 and furthermore an activation of said functionality specifically in the node identified as being closest to the target device.

8. The method according to claim 7, wherein the target device is an internet-access gateway and the functionality is a functionality of a master node coordinating the backhaul subnetwork.

9. The method according to claim 8, further comprising an activation of supplementary functionalities in the node identified as being closest to the internet-access gateway, the supplementary functionalities being firewall functionalities vis-à-vis data streams exchanged via the internet through the internet-access gateway and/or parental control functionalities vis-à-vis data streams exchanged via the internet through the internet-access gateway.

10. A system for extending wireless communication coverage comprising a backhaul subnetwork in the form of a tree comprising a set of interconnected nodes, a plurality of nodes in the backhaul subnetwork implementing a functionality of access point of one and the same wireless communication network, the system for extending wireless communication coverage being suitable for making it possible to connect devices comprising a target device to said nodes by way of the wireless communication network or by wires in order to form a local area network, wherin the system comprises:

means for monitoring messages exchanged during an address resolution phase, and obtaining therefrom an association between network address and Medium Access Control MAC address of each device connected to the local area network and node in the backhaul subnetwork;

means for filling in, in each said node, an address resolution table by indicating therein each association between network address and MAC address obtained by said node, as well as interface information representing an interface of said node via which the message that made it possible to obtain said association was received;

and, in order to identify a node closest to the target device among said nodes in the backhaul subnetwork, the system comprises means for analysing the resolution tables including:

means for parsing the address resolution tables while seeking the association between network address and MAC address corresponding to said target device, and obtaining the associated interface information; and means for identifying the node closest to the target deviceas being the node the address resolution table of which does not reference any node in the backhaul subnetwork in association with said interface information.

11. The system according to claim 10, further comprising means for activating a functionality specifically in the node identified as being closest to the target device.

12. The system according to claim 11, wherein the target device is an internet-access gateway and the functionality is a functionality of a master node coordinating the backhaul subnetwork.

13. The system according to claim 12, further comprising means for activating supplementary functionalities specifically in the node identified as being closest to the internet-access gateway, the supplementary functionalities being firewall functionalities vis-à-vis data streams exchanged via the internet through the internet-access gateway and/or parental control functionalities vis-à-vis data flows exchanged via the internet through the internet-access gateway.

14. A node, referred to as node in question, intended to be used in a system for extending wireless communication coverage comprising a backhaul subnetwork in the form of a tree comprising a set of interconnected nodes including the node in question, a plurality of nodes in the backhaul subnetwork implementing a functionality of access point of one and the same wireless communication network, the system for extending wireless communication coverage being suitable for making it possible to connect devices comprising a target device to said nodes by way of the wireless communication network or by wires in order to form a local area network, wherein the node in question comprises:

means for monitoring messages exchanged during an address resolution phase, and obtaining therefrom an association between network address and Medium Access Control MAC address of each device connected to the local area network and node in the backhaul subnetwork;

means for filling in an address resolution table by indicating therein each association between network address and MAC address obtained by the node in question, as well as interface information representing an interface of the node in question via which the message that made it possible to obtain said association was received;

and, in order to identify whether the node in question is closest to the target device among said nodes in the backhaul subnetwork, the node in question comprises means for analysing its resolution table including:

means for parsing the address resolution table by seeking the association between network address and MAC address corresponding to said target device, and obtaining therefrom the associated interface information;

means for identifying the node in question as being closest to the target device when the address resolution table does not reference any node in the backhaul subnetwork in association with said interface information, and for identifying the node in question as not being closest to the target device otherwise; and means for informing, via the backhaul subnetwork, that the node in question is or is not the node closest to the target device among said nodes in the backhaul subnetwork.

* * * * *